Sept. 18, 1962 R. G. LANDWER 3,054,291
ILLUMINATED LIQUID GAUGE
Filed May 29, 1959
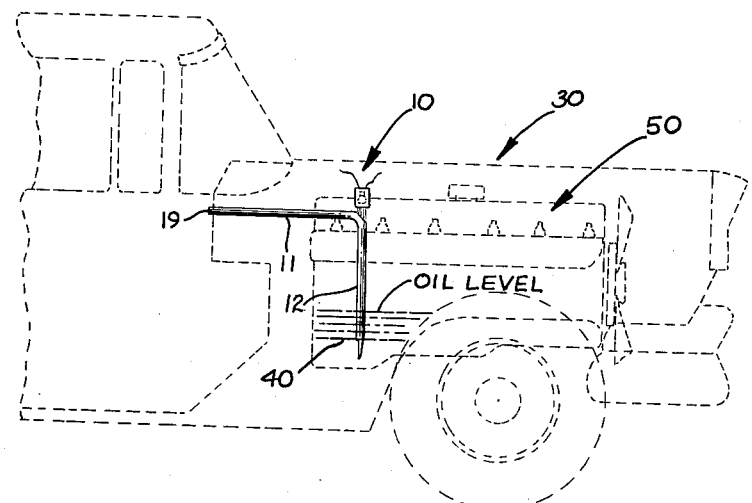
Fig. 1
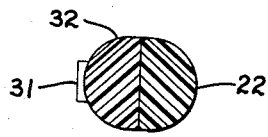
Fig. 5
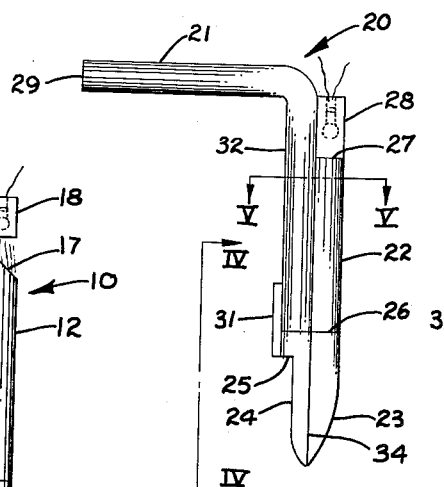
Fig. 3
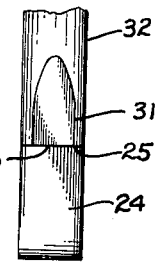
Fig. 4
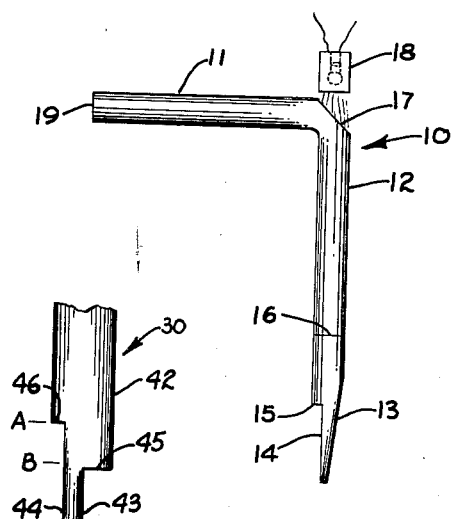
Fig. 2
Fig. 6
INVENTOR
ROBERT G. LANDWER
BY Price and Heneveld
ATTORNEYS ns Patent Office
3,054,291
Patented Sept. 18, 1962

3,054,291
ILLUMINATED LIQUID GAUGE
Robert G. Landwer, 1423 Columbus St.,
Grand Haven, Mich.
Filed May 29, 1959, Ser. No. 816,774
2 Claims. (Cl. 73—293)

This invention relates to a liquid depth indicator of the type that employs reflected light for indicating the depth of the liquid.

This liquid depth indicator is designed to be used primarily to measure the depth of oil, for example, in the crankcase of an engine. However, this liquid depth indicator is also readily adaptable to measuring the depth of liquid in the gear case of a press, the depth of liquid in a reservoir, the depth of fuel in a home type fuel oil storage tank, or any other device in which it is necessary to measure the depth of the liquid.

Generally, depth indicators for measuring the depth of liquid in a reservoir, such as the crankcase of an engine, rely upon some type of pressure sensitive means to indicate the depth of the liquid, or rely upon some type of electrical means in combination with a pressure sensitive means to indicate the depth of liquid. However, it is the purpose of this invention to disclose a liquid depth indicator whereby the depth of the liquid is indicated by means of light wave transmission through a clear plastic rod.

This type of liquid depth indicator has the advantage that it is very simple in construction. Therefore, there is very little chance of the device failing while in operation. Also, this type of depth gauge, since it consists of a very few parts, is inexpensive to manufacture. It further has the advantage of being a sensitive type of indicator which immediately indicates when the liquid level is low. Another advantage of this device is that the level of the liquid is indicated by a light beam which is striking to the eye of the user, and will immediately call his attention to the fact that the level of liquid is low.

Therefore, it is an object of this invention to make a liquid depth indicator which is of the type that uses light waves to indicate the depth of the liquid.

Another object of this invention is to provide for a liquid depth indicator which is very simple in construction.

Still another object of this invention is to disclose a liquid depth indicator which is inexpensive to manufacture.

Yet another object of this invention is to disclose a liquid depth indicator in which there are no moving parts.

Another object of this invention is to show a liquid depth indicator of the type that indicates by transmitting light waves to a viewing surface which will be striking to the viewer's eye.

Another object of this invention is to disclose a liquid depth indicator in which the viewing surface changes color when the depth of the liquid is at a dangerous level.

Other objects of this invention will become more obvious upon reading the following specification in conjunction with the accompanying drawings wherein:

FIG. 1 is a side elevational view of the liquid depth indicator as it would be installed in a vehicle.

FIG. 2 is an enlarged side elevational view of the liquid depth indicator.

FIG. 3 is an enlarged side elevational view of a modified form of liquid depth indicator.

FIG. 4 is a fragmentary elevational view taken along the plane IV—IV of FIG. 3.

FIG. 5 is an enlarged cross sectional view taken along the plane V—V of FIG. 3.

FIG. 6 is a fragmentary side elevational view of still another modification of the liquid depth indicator.

Referring to the drawings, FIG. 1 shows an over-all arrangement of a liquid depth indicator which for purposes of this invention will be termed an L-shaped wave transmitting member and designated generally as 10. The L-shaped wave transmitting member has a wave transmitting leg 11 which leads to a viewing surface 19 of the device (FIG. 3). Integral with the leg 11, but at an angle thereto, is another leg 12 of the L-shaped wave transmitting member 10. The leg 12 is disposed with respect to the leg 11 so that it may be placed in liquid 40 such as shown in FIG. 1.

The L-shaped wave transmitting member 10 is constructed of a clear plastic material such as certain transparent acrylic resins. However, it is to be understood that the member 10 can be constructed of any other material having the same light transmission properties and a surface index of refraction such that the light will be caused to travel and be contained within the material. Such a material is exemplified by an acrylic resin sold under the trademark Lucite by E. I. du Pont de Nemours, or a methyl methacrylate resin sold under the trademark Plexiglas by Rohm and Haas. Such a material is used because of its physical property which is the ability to receive, transmit and confine within its body visible light which is passed therethrough.

The leg 12 of the L-shaped wave transmitting member 10 has an oblique or tapered surface 13. This surface 13 preferably is roughened so that light rays striking the rough surface are readily reflected back into the body of the member 10. The surface 14 of the leg 12 preferably is also roughened for the same reason. Leg 12, in addition, has a direct reflecting surface 15. This surface, being generally normal to the axis of the leg 12, is so positioned that light waves being transmitted through the leg 12 will come into direct contact therewith and be reflected directly therefrom. The surface 15 of the leg 12 also has the purpose of indicating when the liquid, for example, is a quart low in the crankcase or reservoir. This concept will be explained more fully hereinafter. The L-shaped wave transmitting member 10 has a surface 17 which is at the juncture of the legs 11 and 12 of the L-shaped member. The surface 17 is polished so that it will readily admit light waves which are projected thereon from an external source. Also, the surface 17 is so positioned so that it will transmit the reflected waves from the surfaces 13, 14 and 15 onto the viewing surface 19.

Positioned above the surface 17 is a light source 18. The light source 18 is of a conventional incandescent type. The light source may be connected directly to the ignition system of a vehicle, so that upon actuation of the ignition system an indication of the liquid level is immediately projected on the viewing surface 19. If the liquid depth indicator were installed in a fuel storage tank situated in a home the light source might be a conventional 25 watt bulb attached to the 110 volt circuit in the house.

The leg 12 of the L-shaped wave transmitting member has a line 16 which might be termed a signal indicator line. The leg 12 below the line 16 is colored red or any other color that the viewer desires to be indicated at the viewing surface 19. It is to be understood that the portion of the leg 12 below the line 16 could be made of colored Lucite of the desired shade or by this portion of the leg being given a surface coating of the desired color.

*Operation*

Having explained the structure of the device, the operation of the device will now be explained. As shown by FIG. 1, the liquid depth indicator, if used in a vehicle, has the leg 12 of the liquid depth indicator positioned so that the oil in the reservoir or crankcase of the engine 50 covers the color line 16. The leg 11 of the L-shaped fluid depth indicator is then positioned so that the viewing surface 19 can be seen from the inside of the vehicle. A light source 18 is positioned over the light admitting surface 17 so that the beam of the light is directed along the leg 12.

It is well-known that materials consisting of light transmitting properties, such as that of Lucite, have the ability to contain light transmitted therethrough when in a medium having a density such as air. It is also a property of such material that when disposed in a medium of a density similar to that of its own, the light rather than being contained therein is transmitted into the medium in which it is disposed. In this device the light beam is contained within the transmitting member as long as it travels within the area of the member that is above the liquid, however, when the light enters the portion of the wave transmitting member that is disposed in the liquid it no longer remains in the member but is transmitted out into the liquid. In the portion of the wave transmitting member where the light is contained, a certain amount of reflection takes place and this reflected light appears at the viewing surface 19. If the level of the liquid is high, the light within the transmitting member not transmitted into the liquid is reflected back to the viewing surface and appears the color of the transmitting member. As previously stated, the lower portion of the wave transmitting member is coated with a color such as red, or is composed of colored material of which the member itself is made. If the level of the liquid diminishes to the point where some of the colored portion of the wave transmitting member is exposed to the medium of air, the light beam is contained and passes through this area before it enters the portion of the member disposed in the liquid. Since the light is contained in this colored portion of the member, it is reflected back to the viewing surface 19 and the color appearing at the viewing surface 19 will be that of the color used to coat the member or a color of which the member is composed of in that portion. As the liquid continues to diminish, it is obvious that the light beam must pass through and be contained in a greater area of the colored portion of the wave transmitting member. Therefore, since the light beam passes through a greater colored area before it passes into the liquid medium, its reflection at the viewing surface 19 will be more intense than if it passed through a smaller colored area. It should be obvious from this description that the intensity of color at the viewing surface 19 will increase as the level of the liquid diminishes.

Upon the light source 18 being energized, the beam of light pentrates the surface 17 and proceeds along the leg 12 of the L-shaped wave transmitting member. As long as the liquid 40 is at a level such that the color line 16 is covered, the hue of the light beam appearing at the viewing surface 19 is that of the light in the rod. The reflected light travels up the leg 12 and down the leg 11 and appears on the surface 19.

However, if the liquid level 40 diminishes to a point where it is below the signal indicator line 16 the light beam before it reaches the level of the liquid passes below the top of the color line 16 into an area of the leg 12 which is coated red or is of plastic and that is exposed to the medium of air. When the light is reflected in this portion of the rod, the reflected light waves will assume the red hue of the coated sides or colored portion of the leg 12 and be transmitted to the viewing surface 19. The color of the light at the viewing surface 19 is now of a pink shade rather than the color of the wave transmitting member previously mentioned. When the liquid diminishes to the point where the level is the same as that of the direct reflecting surface 15, the color at the viewing surface is sharply intensified and appears red. This is true because the direct reflecting surface 15 lies in a path transverse to the flow of the light beam, therefore, the beam as it strikes the surface 15 is reflected directly back and will increase the color intensity at the viewing surface 19 since more light beam is being reflected. As the level of the liquid diminishes still more the intensity at the viewing surface 19 increases. This can be explained from the fact that the light beam as it is reflected must travel through a greater area of the leg 12 which is coated red or is of a red plastic. Since the reflected light beam must travel through a greater exposed surface area of colored plastic, naturally the hue of the light beam will be more intense.

FIGS. 3 through 5 show a modified form of liquid depth indicator which is designated generally as 20. The liquid depth indicator 20 has the same basic principle of operation as the liquid depth indicator 10, however, it is structurally somewhat different.

The depth indicator 20 has a leg 21 which has a viewing surface 29 at one of its ends. The depth indicator 20 has another leg 32 which is integral with leg 21 but disposed at an angle thereto. A leg 32 is adapted to be positioned in a liquid for purposes of reflecting light back to the viewing surface 29. The wave transmitting member 20 also has an associated leg 22 which is positioned directly adjacent to the leg 32.

The wave transmitting member 20 is made of Lucite or some other clear plastic material having the same light transmitting properties. The leg 22 is bonded to the leg 32 along the bond line 34. An adhesive such as acrylic resin or acrylate methacrylate may be used to bond the leg 22 to the leg 32.

The leg member 22 has a tapered or oblique surface 23 which is roughened to increase the reflection properties thereof. The leg 32 has an oblique reflecting surface 24 which is also roughened to provide for better reflecting properties. The oblique surfaces 23 and 24 change the angle of incidence of the light waves as they travel down the tube, increasing reflection and the intensity of the color at the viewing surface 29 as the liquid level diminishes. Leg 32 has an additional surface 25 which may be termed a direct reflecting surface since it is in the direct path of a light beam as it travels down the leg 32.

The leg 32 has a member 31 bonded thereto which may be termed a reflecting plate. The adhesive used to bond the member 31 to the leg 32 may be similar to the adhesive used to bond the legs 32 and 22 together.

The legs 32 and 22 have a color line 26 positioned transverse thereto. The legs 32 and 22 of the liquid depth indicator 20 are coated a red color, or any color desired, below the color line 26. The area of the legs 32 and 22 below the color line 26 may also be colored by making this area of a colored plastic. Member 31 is coated or made from colored plastic and is of a different color than the area of legs 32 and 22 below the color line 26. The reason for this will be explained more fully hereinafter.

The depth indicator 20 is provided with a light source as shown at 28. The light source may be placed within a member which is integral with the leg 22, or may be made as an entirely separate member. The leg 22 has a polished light admitting surface as shown at 27. By placing the light admitting surface 27 on the leg 22, the light transmitted to the viewing surface 29 is increased since the reflected light does not escape from a polished surface such as 17 in the FIG. 2 embodiment.

Although the liquid depth indicator 20, as shown in FIGS. 3 through 5, is made of separate pieces bonded together, it is to be understood that such a liquid depth indicator might be molded as a one piece unit. Due to the necessity to make the various components a different color, it is more economical to use separate pieces and bond them together.

The operation of the liquid depth indicator 20 is quite similar to that of the liquid depth indicator 10. However, it has the added feature that there is a three color indication at the viewing surface 29 rather than a two color indication as produced by the depth indicator 10.

Assume that the liquid depth indicator 20 is positioned in a vehicle similar to the arrangement shown in FIG. 1, and that the liquid level is of a depth so that it reaches or almost reaches the top of the member 31. The source of light 28 is energized and a light beam is directed against the admitting surface 27 and enters thereby. The light beam travels downs the legs 22 and 32 and is contained in the light transmitting member in the area above the liquid, and a certain amount of the beam is reflected back up the leg 32, down the leg 21, and appears at the viewing surface 29, the rest of the beam is transmitted into the liquid as previously explained. Since the light is reflected within the clear plastic portion of the liquid depth indicator, the light beam at the viewing surface 29 will appear to be the color of the plastic. However, assume that the depth of the liquid 40 diminishes to the point where the level is at a position above the color line 26 but is below the top of the member 31. A portion of the member 31 is then exposed to the medium of air and reflection will take place in this area and the light beam will pick up the coloring of the member 31. The beam at the viewing surface 29 will now be the hue of the color of the member 31. If the liquid diminishes to a point below the indicating line 26, the reflected light beam will assume the color of the legs 32 and 22 below the color line 26, and this color will now be indicated at the viewing surface 29. The color of the legs 32 and 22 below line 26 must be a dominant color to overcome the color of the member 31. When the liquid diminishes to a point below the level of the surface 25, the coloring at the viewing surface 29 becomes quite intense because the light waves are reflected directly from the direct deflecting surface 25 as previously described. As the level of the liquid continues to diminish the intensity increases in a manner similar to that described in the liquid depth indicator 10.

FIG. 5 shows still another modification of the liquid depth indicator, and is designated generally as 30.

The upper portion of the liquid depth indicator 30 is identical to the upper portion of the liquid depth indicator 10 and, therefore, will not be further described.

The liquid depth indicator 30 has a leg 42 which is adapted to be immersed in a liquid. The leg 42 on one side thereof has a transverse cut or indentation therein forming a surface 45. The leg 42 continues at an angle normal to the surface 45 with a surface which is designated 43. The surfaces 45 and 43 are coated with some color preferably red.

The other side of the leg 42 also has a transverse cut or indentation therein forming a surface 46. A surface 44 extends in a direction normal to the surface 46 and terminates below the surface 45. The surfaces 43 and 44 compose the lowermost portion of the leg 42. The surfaces 43 and 44 terminate at a surface 47 which forms the bottom of the indicator. The surface 47 is also transverse to the path of the light beam. The surface 47 may be coated, and if coated is the same color as the surfaces 43 and 45. The surface 46 appears at a point considerably higher on the rod than the surface 45, so that, as the liquid diminishes the color of the surface 46 will appear on the viewing surface first. The surface 46, and the portion of the surface 44 between A and B are coated with a different color than the surfaces 43 and 45, and is preferably amber or yellow in color.

The operation of the liquid indicator 30 is similar to that of the liquid indicator 20.

When the leg 42 is immersed in a liquid so that the liquid covers the surface 46, the color appearing at the viewing surface will be that of the clear plastic rod. When the liquid diminishes to a point below the surface 46, but remains above the surface 45, the color at the viewing surface will appear to be that of the color of the rod between A and B. As the liquid diminishes still further and is lowered to a point where it is below the surface 45, then the color at the viewing surface becomes red, or the color of the surfaces 45 and 43. Notice, that the surfaces 45 and 46 are both transversed to the path of travel of the light beam, therefore, the light will be reflected directly from these surfaces back to the viewing surface.

The surface 45 is at least twice as wide as the surface 46 so that when the liquid diminishes to a point below the surface 45, much more light is reflected from the surface 45 than the surface 46, therefore, the color of the surface 45 dominates the surface 46. To assist in the color of the surface 45 overcoming that of the surface 46, the usual practice is to coat the surfaces 43 and 45 with a dominate color, and the surface 46 and the portion between an A and B a color that is easily overcome by the dominate color.

The liquid depth indicator 30 is so positioned in the liquid that when the level of the liquid is between A and B an amber or color of caution is indicated at the viewing surface. However, when the liquid diminishes to a point below the surface 45, it is at a dangerous level, and is indicated by a bright dominant color such as red at the viewing surface.

As in the liquid depth indicator 10 and 20 the intensity of the color appearing at the viewing surface increases as the level of the liquid continues to diminish.

It can thus be seen that the liquid depth indicator 10 or the modified indicator 20 and 30 measure the depth of liquid in a reservoir quickly and accurately. It can also be seen that such a device is simple and consists of a few parts, none of which are movable, therefore, the maintenance cost of such a device is very low.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

I claim:

1. A liquid depth indicating device comprising; a wave transmitting member being made of a material having good light transmitting properties, said wave transmitting member having a first leg adapted to be placed in a liquid for measuring the depth thereof, a second leg integral with said first leg, said second leg having a viewing surface; a third leg bonded to one side of said first leg, a reflecting member bonded to the other side of said first leg, a source of light, said third leg having a surface capable of admitting light from said light source, said first and third legs having roughened surface means for reflecting light from said source, said roughened surfaces of said legs being a different color than the remainder of the legs, said reflecting plate being positioned above said colored portion of said first and third legs and of a different color whereby the light reflected to the viewing surface changes color from that of member material, to the color of the reflecting plate, to the color of the reflecting surface means, and increases in intensity of color as the level of the liquid in which it is disposed diminishes.

2. A liquid depth indicating device as in claim 1 wherein the roughened surface means includes a surface transverse to the flow of the light beam.

References Cited in the file of this patent

UNITED STATES PATENTS

| | | |
|---|---|---|
| 2,301,460 | Sauer | Nov. 10, 1942 |
| 2,468,833 | Murphy | May 3, 1949 |
| 2,615,337 | Maybach | Oct. 28, 1952 |
| 2,620,660 | Goldsmith | Dec. 9, 1952 |
| 2,637,209 | Kendall | May 5, 1953 |